United States Patent [19]
O'Mahony

[11] Patent Number: 5,878,120
[45] Date of Patent: Mar. 2, 1999

[54] MECHANISM AND METHOD FOR MULTIPLEXING VOICE AND DATA OVER A SIGNAL CARRIER WITH HIGH BANDWIDTH EFFICIENCY

[75] Inventor: Barry O'Mahony, Banks, Oreg.

[73] Assignee: Intel Corporation, Santa Clara, Calif.

[21] Appl. No.: 805,898

[22] Filed: Feb. 24, 1997

Related U.S. Application Data

[63] Continuation of Ser. No. 346,077, Nov. 29, 1994, abandoned, which is a continuation-in-part of Ser. No. 265,326, Jun. 24, 1994, abandoned.

[51] Int. Cl.⁶ .................................................. H04M 11/00
[52] U.S. Cl. .................................... 379/93.09; 379/93.29; 370/433; 370/493; 375/222
[58] Field of Search ............................ 379/90.01, 93.09, 379/93.08, 93.29; 320/433, 493, 494, 495, 463, 528; 375/222, 219, 220

[56] References Cited

U.S. PATENT DOCUMENTS

| | | |
|---|---|---|
| 2,974,281 | 3/1961 | Feldman . |
| 4,435,804 | 3/1984 | Tan ........................................ 370/69.1 |
| 4,442,540 | 4/1984 | Allen ........................................ 381/31 |
| 4,476,559 | 10/1984 | Brolin et al. ............................ 370/125 |
| 4,512,013 | 4/1985 | Nash et al. ............................. 370/69.1 |
| 4,644,527 | 2/1987 | Anderson et al. ....................... 370/58 |
| 4,715,059 | 12/1987 | Cooper-Hart et al. .................... 379/53 |
| 4,757,495 | 7/1988 | Decker et al. ............................ 370/76 |
| 4,805,208 | 2/1989 | Schwartz .................................. 379/93 |
| 4,813,040 | 3/1989 | Futato .................................... 370/111 |

(List continued on next page.)

FOREIGN PATENT DOCUMENTS

| 501485 | 2/1992 | European Pat. Off. . |
| 2187611 | 2/1987 | United Kingdom . |

OTHER PUBLICATIONS

Newton's Telecom Dictionary, 7th edition, Apr. 1994, p. 617, Harry Newton.
"User Deploys Date-Voice System" Network Applications, 1 page, Jeffrey Schwartz.
"VoiceView Officer Voice And Data Over Single Analog Line", Paul Stockford, Voice Processing Magazine, Jul. 1992, pp. 30–31, Paul Stockford.
Mitel Corporation Data Sheet for "Data Over Voice Modem", Part#MT8840, Issue 3, Dec. 1987.

*Primary Examiner*—Curtis Kuntz
*Assistant Examiner*—Stephen W. Palan
*Attorney, Agent, or Firm*—Blakely, Sokoloff, Taylor & Zafman

[57] ABSTRACT

A micro-controller having multiple operating modes, including an idle mode, an analog voice mode, a digital data mode, and a simultaneous voice and data (SVD) mode, is provided to a DCE designed to support multi-modal voice and/or data calls over a single analog-loop telephone line. The micro-controller further contains control logic for establishing multiple logical connections and voice as well as data transmission protocols over these logical connections with another DCE, when switching from the analog voice mode to the SVD mode, and for multiplexing voice and data transmissions over these logical connections. The control logic transmits voice over a logical voice connection in nominally fixed intervals. A non-voice transmission, i.e. data or information to be exchanged, can be suspended in favor of transmitting a voice transmission. During the suspension, a special character (e.g., escape) is transmitted in conjunction with a length preceding the voice transmission. After the voice transmission is complete, the data transmission is continued. By suspending (rather than ending and then restarting) the non-voice transmission, a large amount of "framing bits" are effectively eliminated and the bandwidth efficiency of the multiplexed transmission is increased. Effectively, voice information can be transmitted embedded within a data (e.g., non real time) transmission.

28 Claims, 13 Drawing Sheets

U.S. PATENT DOCUMENTS

| | | | |
|---|---|---|---|
| 4,932,047 | 6/1990 | Emmons et al. | 379/53 |
| 4,991,197 | 2/1991 | Morris | 379/58 |
| 5,086,453 | 2/1992 | Senoo et al. | 379/93 |
| 5,091,877 | 2/1992 | Itoh et al. | 395/200 |
| 5,182,762 | 1/1993 | Shirai et al. | 375/122 |
| 5,200,962 | 4/1993 | Kao et al. | 374/41 |
| 5,250,940 | 10/1993 | Valentaten et al. | 345/189 |
| 5,283,638 | 2/1994 | Engberg et al. | 384/14 |
| 5,325,423 | 6/1994 | Lewis | 379/90 |
| 5,359,644 | 10/1994 | Tanaka et al. | 379/90 |
| 5,365,576 | 11/1994 | Tsumura et al. | 379/97 |
| 5,428,608 | 6/1995 | Freeman et al. | 370/60.1 |
| 5,440,585 | 8/1995 | Partridge, III | 375/261 |
| 5,452,289 | 9/1995 | Sharma et al. | 379/93 |
| 5,463,616 | 10/1995 | Kruse et al. | 370/24 |
| 5,502,727 | 3/1996 | Catanzaro et al. | 379/93 |

MECHANISM AND METHOD FOR MULTIPLEXING VOICE AND DATA OVER A SIGNAL CARRIER WITH HIGH BANDWIDTH EFFICIENCY

This is a continuation of application Ser. No. 08/346,077 filed, now abandoned, which is a continuation in part of application Ser. No. 08/265,326, filed Jun. 24, 1994 abandoned.

BACKGROUND OF THE INVENTION

1. Related U.S. Patent Applications

This is a continuation-in-part of U.S. patent application Ser. No. 08/265,326 entitled "Method And Apparatus For Multiplexing Voice And Data Over A Single Analog-Loop Telephone Line," filed Jun. 24, 1994, by Barry O'Mahony et al., and assigned to the assignee of the present invention.

2. Field of the Invention

The present invention relates to the field of Data Communication. More specifically, the present invention relates to data circuit terminating equipment's (DCEs) such as modems for transmitting voice and data over analog-loop telephone lines.

3. Prior Art

Current DCEs that support transmission of both voice and data over a single analog-loop telephone line typically implement the support in one of two approaches. Under the first approach, a DCE operates in one of two switchable modes, a voice mode and a data mode, whereas under the second approach, a DCE operates in a single continuous combined voice and data mode.

More specifically, under the first approach, both the calling and answering DCEs start out in the voice mode, where analog voice signals are bypassed from the transmitting telephone coupled to one of the DCEs onto the analog-loop telephone line, and similarly from the analog-loop telephone line to the receiving telephone coupled to the other DCE. While the DCEs are in voice mode, no data are transmitted by the DCEs on behalf of data transmitting equipment's (DTEs), such as computers, coupled to the DCEs at both end of the connection. To switch into the data mode, one of the DTEs would cause its DCE to transmit a predetermined signal pattern on its behalf. Upon detection of the predetermined signal pattern, the other DCE would acknowledge. If the acknowledgment is received by the initiating DCE within a predetermined time period, the DCEs would jointly establish a data transmission protocol, enter the data mode, and mute the DCE's voice path. The DTEs can now transmit data to each other through their respective DCEs and over the analog-loop telephone line. At the end of data transmission, the DTE that initiated the mode switching would cause its DCE to transmit another predetermined signal pattern on its behalf, return to the voice mode, and unmute the voice path. Likewise, upon detection of this other predetermined signal pattern, the other DCE would also forward the signal to its DTE, return to the voice mode, and unmute the voice path. Voice signals are once again bypassed from the transmitting telephone onto the telephone line, and from the telephone line to the receiving telephone.

Typically, the data transmission protocol jointly established by the calling and answering DCEs as an integral part of switching from the voice mode to the data mode is a High Level Data Link (HDLC) frame based type protocol.

Under the second approach, the DCEs always operate in a single continuous combined voice and data mode. The DCEs jointly establish a data transmission protocol at start up. The analog voice signals received from the coupled telephones are digitized by the DCEs or forwarded to the coupled DTEs for digitization. The DCEs transmit the digitized voice signals intermixed with the data received from the coupled DTEs. Conversely, the digitized voice signals received from the analog-loop telephone line are converted back into analog voice signals by the DCEs or forwarded to the coupled DTEs for conversion. The DCEs then forward the analog voice signals to the telephones.

Generally, the data transmission protocol jointly established by the calling and answering DCEs as an integral part of the initial start up of the single continuous combined voice and data mode is also a High Level Data Link (HDLC) frame based type of protocol. Except for "marking" the digitized voice to facilitate their identification and conversion back to analog voice signals, the digitized voice are otherwise handled as if they are data.

The first approach has the disadvantage that there is no voice communication between the connected parties during data transmission. Thus, DCEs implementing the first approach are really suitable only for applications where voice communication is unnecessary during data transmission or data transmission is merely required intermittently and for short duration.

The second approach has the disadvantage that the DCEs on both ends of the connection must support continuous combined voice and data mode. Therefore, for applications frequently involving "unacquainted" users, an initial phone call using "standalone" telephones directly coupled to another analog-loop telephone line must be made to establish the fact that such continuous combined voice and data call can be made between two DCE coupled telephones. Thus, DCEs implementing the second approach are really suitable only for applications involving primarily "acquainted" users.

With the continuing increase in the capabilities microprocessor based desktop computers, they are being applied to more and more applications that require simultaneous voice and data communications between two users. A particular example of these applications is personal conferencing where users at different sites cooperate orally and interactively with a shared workspace application on the creation or review of documents. Another example is remote technical support where the support engineers communicate orally with the users as well as interacting remotely with programs executing on the users' systems for diagnostic or demonstration purposes. Due to the disadvantages discussed above, neither types of DCEs serve these applications well. As a result, most users of these applications resort to two telephone lines, with one dedicated for voice communication, and the other dedicated to data communication.

Thus, it is desirable to be able to support multi-modal voice and data communication between two users over a single analog-loop telephone line that is more flexible and user friendly. U.S. patent application, Ser. No. 08/265,455, filed on Jun. 24, 1994, entitled Method and Apparatus for Making a Multi-Modal Voice and/or Data Call Over a Single Analog-Loop Telephone Line, discloses such method and apparatus. Under the disclosed method and apparatus, at least four modes, an idle mode, an analog voice mode, a digital data mode, and a simultaneous voice and data (SVD) mode are supported. It is also desirable then to be able to multiplex voice and data over the single analog-loop telephone line while operating in the SVD mode.

However, within a system that allows multiplexing of data and voice over a single analog loop telephone line, there often can be experienced a great deal of bandwidth devoted to "framing bits." Framing bits are required under certain communication protocols to indicate or differentiate between communication of certain types of data, for instance, voice information and non-voice or data information. During multiplexing of communication, when a particular type of data communication is interrupted or suspended, framing bits are required to close out the interrupted communication and more framing bits are required to start the next communication. Therefore, as the amount of multiplexing within a single analog loop line is allowed to increase, the amount of communication bandwidth taken up by framing bits increases and the overall effectiveness of the communication protocol to transmit and receive information (e.g., voice, or data) decreases. It would be desirable to provide a communication protocol that allows a large degree of multiplexing and high rates, yet still allows high bandwidth effectiveness. As will be disclosed in more detail below, the present invention provides for such method and apparatus that advantageously achieves these and other desirable results.

Accordingly, it is an object of the present invention to provide more effective communication within a single analog-loop telephone line. It is yet another object of the present invention to provide high bandwidth efficiency within a system allowing simultaneous voice and data (SVD) mode communication over a single analog-loop telephone line. To this end, it is further an object of the present invention to provide the above by reducing the amount of framing bits required when multiplexing between voice and data communications. These and other objects of the present invention not specifically stated above will become clear within discussions of the present invention herein.

SUMMARY OF THE INVENTION

A method and apparatus including a micro-controller having multiple operating modes, including an idle mode, an analog voice mode, a digital data mode, and a simultaneous voice and data (SVD) mode, is provided to a DCE designed to support multi-modal voice and/or data calls over a single analog-loop telephone line. The micro-controller further contains control logic for establishing multiple logical connections and voice as well as data transmission protocols over these logical connections with another DCE, when switching from the analog voice mode to the SVD mode, and for multiplexing voice and data transmissions over these logical connections. The control logic transmits voice over a logical voice connection in nominally fixed intervals. A non-voice transmission, i.e. data or information to be exchanged, can be suspended in favor of transmitting a voice transmission. During the suspension, a special character (e.g., escape) is transmitted in conjunction with a length preceding the voice transmission. After the voice transmission is complete, the data transmission is continued. By suspending (rather than ending and then restarting) the non-voice transmission, a large amount of "framing bits" are effectively eliminated and the bandwidth efficiency of the multiplexed transmission is increased. Effectively, voice information can be transmitted embedded within a data (e.g., non real time) transmission.

The above allows multiplexing of reliable data and real-time data (e.g., voice) on a single modem link. In one embodiment, reliable data is transmitted using standard ITU-T V.42 error control protocol procedures. The real-time data transmission is used for data types such as the bit stream from a low bit rate voice vocoder, which does not tolerate the variable latency and throughput of the V.42 LAPM link. The present invention allows greater bandwidth efficiency in those cases where the real-time bandwidth is a large percentage of the total available bandwidth, while allowing low latency. This greater efficiency translates into higher bandwidth for the non-real-time data.

Specifically, embodiments of the present invention include a mechanism for efficiently transmitting multiplexed voice information and non voice information, the mechanisms including: a transmission microcontroller for transmitting voice information in accordance with a voice transmission protocol over a first logical connection established over an analog-loop telephone line at nominally fixed time intervals and for transmitting non voice information to be exchanged with a cooperating DCE in accordance with a data transmission protocol over a second logical connection established over the analog-loop telephone line when the transmission microcontroller is not transmitting voice information and when operating the DCE in a simultaneous voice and data (SVD) mode of operation; and the transmission microcontroller also for suspending transmission of non voice information over the second logical connection when voice information is ready for transmission, the transmission microcontroller for transmitting a special character to indicate transmission of the voice information and the transmission microcontroller for transmitting a signal indicating a length of the voice information and the transmission microcontroller for transmitting the voice information under a modified voice transmission protocol while the non voice information is suspended and wherein the modified voice transmission protocol does not include framing bits for transmitting the voice information.

Embodiments of the present invention include the above and wherein the transmission microcontroller immediately resumes transmission of the suspended non voice information over the second logical connection upon completing transmission of the voice information under the modified voice transmission protocol and wherein the voice information is real time information and wherein the non voice information is not real time information.

Embodiments of the present invention include a method for multiplexing voice and data over a first and a second logical connections over an analog-loop telephone line using a data circuit terminating equipment (DCE) when operating the DCE in a simultaneous voice and data (SVD) mode of operation, the method including the steps of: transmitting voice information in accordance with a voice transmission protocol over a first logical connection established over the analog-loop telephone line at nominally fixed time intervals when non voice information is not present; and transmitting non voice information to be exchanged with a cooperating DCE in accordance to a data transmission protocol over a second logical connection established over the analog-loop telephone line when not transmitting voice information; and when transmitting the non voice information and voice information is coincidentally ready for transmission, performing the steps of: suspending transmission of the non voice information over the second logical connection when the voice information is ready for transmission; and transmitting the voice information under a modified voice transmission protocol wherein the modified voice transmission protocol does not include framing bits for voice information transmission.

DETAILED DESCRIPTION

Figure 1A:
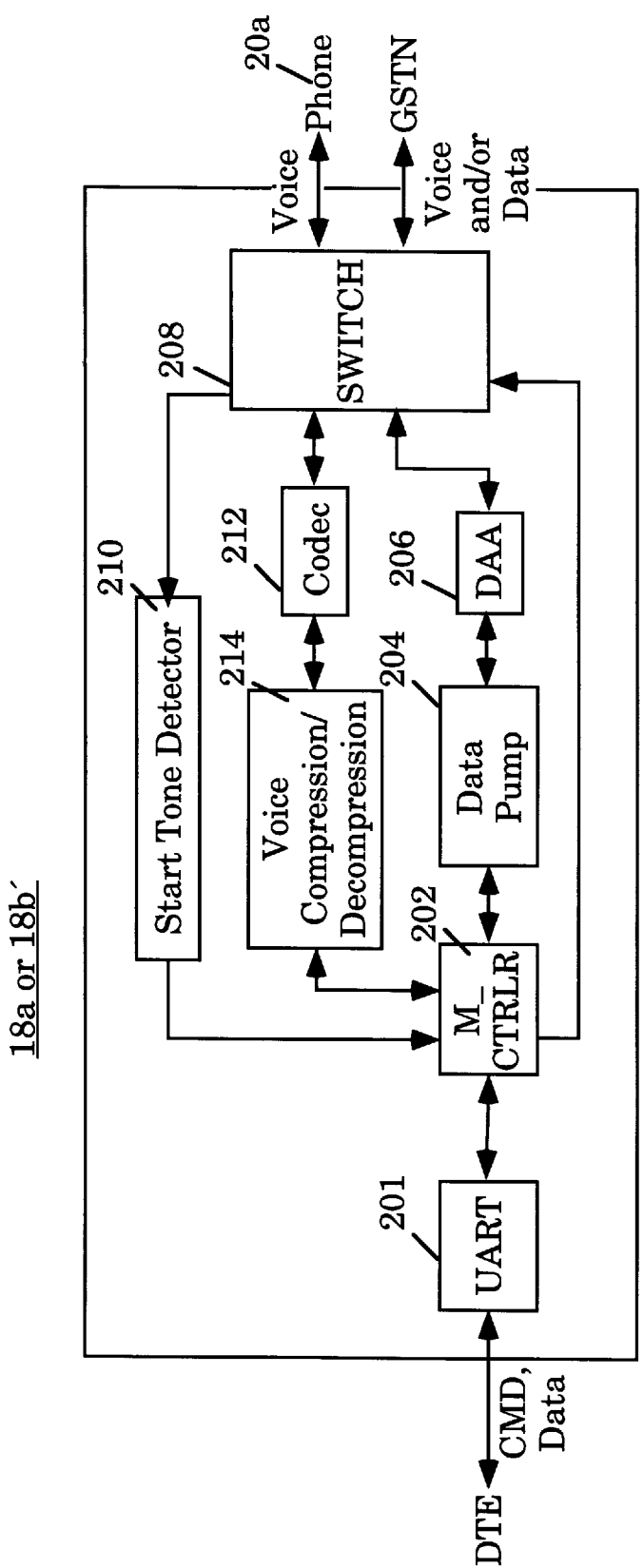
FIGS. 1*a*, 1*b*, 1*c*, and 1*d* illustrate four embodiments of DCEs incorporating teachings of the present invention.

In the following description for purposes of explanation, specific numbers, materials, components, procedures, circuits and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure aspects of the present invention.

Referring now to FIGS. 1a, 1b, 1c, and 1d, four block diagrams illustrating four embodiments of DCEs incorporating teachings of the present invention are shown. As illustrated, a DCE 18a, 18b', 18b", 18c' or 18c" in accordance to the present invention comprises an enhanced micro-controller 202 incorporating teachings of the present invention. The DCE 18a, 18b', 18b", 18c' or 18c" further comprises a universal asynchronous receiver/transmitter (UART) 201, a data pump digital signal processor 204, data equipment attachment adapter circuitry (DAA) 206, and predetermined start up signal detection circuitry 210.

Additionally, for the first and second embodiments designed to support standalone telephones 20a, the DCE 18a, 18b', or 18b" further comprises enhanced switching circuitry 208, and analog to digital and digital to analog conversion circuitry (CODEC) 2148 . For these embodiments, the enhanced switching circuitry 208 includes the conventional "loop current detector" for detecting when the standalone telephone 20a goes off hook an starts drawing loop current, whereas the CODEC 212 includes the conventional "local phone interface" for combining the voice signals with the DC voltage for the telephone 20a. The DCE 18a or 18b' further comprises a "local" voice compression/decompression digital signal processor 214, whereas the DCE 18b" further comprises block transfer circuitry 203. The DCE 18b" relies on the processing engine of the DTE for voice compression/decompression. The DCE 18a or 18b' may be packaged as a separate unit from the DTE 16a or an integral part of the DTE 16b, whereas the DCE 18b" is intended to be packaged as an integral part of the DTE 16b.

For the third and fourth embodiments designed to support integrated telephony circuitry 20b, the data pump digital signal processor 204 of DCE 18c' or 18c" is further provided with the "CODEC" capabilities. The DCE 18c' or 18c" further comprises block transfer circuitry 203. The DCE 18c' further comprises a "local" voice compression/decompression digital signal processor 214, whereas the DCE 18c" relies on the processing engine of the DTE for voice compression/decompression. Both embodiments of the DCE 18c' and 18c" are intended to be packaged as an integral part of the DTE 16c.

The micro-controller 202, as will be described in more details below, operates the DCE 18a–18c in at least four modes, transitioning the DCE 18a–18c between these operating modes responsive to local events or commands, as well as remote commands as appropriate. It is appreciated that reference to DCE 18z refers to each of the implementations shown in FIG. 1a (e.g., 18a or 18b'), FIG. 1b (e.g., 18b"), FIG. 1c (e.g., 18c'), and FIG. 1d (e.g., 18c").

The switching circuitry 208, if used, responsive to the multi-modal micro-controller 202, dynamically configures signal paths for the signals being received or to be transmitted over a coupled analog-telephone line. The signal paths for the embodiments 18c' and 18c" without the switching circuitry are pre-configured. For further description of the switching circuitry 208, see the above identified U.S. patent appplication, Ser. No. 08/265,455, which is hereby fully incorporated by reference.

The data pump digital signal processor 204 and the voice compression/decompression digital signal processor 214 are intended to represent a broad category of digital signal processors known in the art. Their constitutions and functions are well known, and will not be further described. Preferably, the data pump digital signal processor 204 is a high performance digital signal processor capable of supporting a transmission rate of 14,400 bps or higher, whereas the voice compression/decompression digital signal processor 214 is also a high performance digital signal processor capable of supporting a compression/decompression rate of 9600 bps or less.

The UART 201, the DAA 206, the CODEC 212, and the start up signal detection circuitry 210 are all intended to represent a broad category of these elements found in many DCEs. Similarly, the block transfer circuitry 203 is intended to represent a broad category of the element found in many computer systems. Their constitutions and functions are well known, and will not be further described.

Figure 1B:
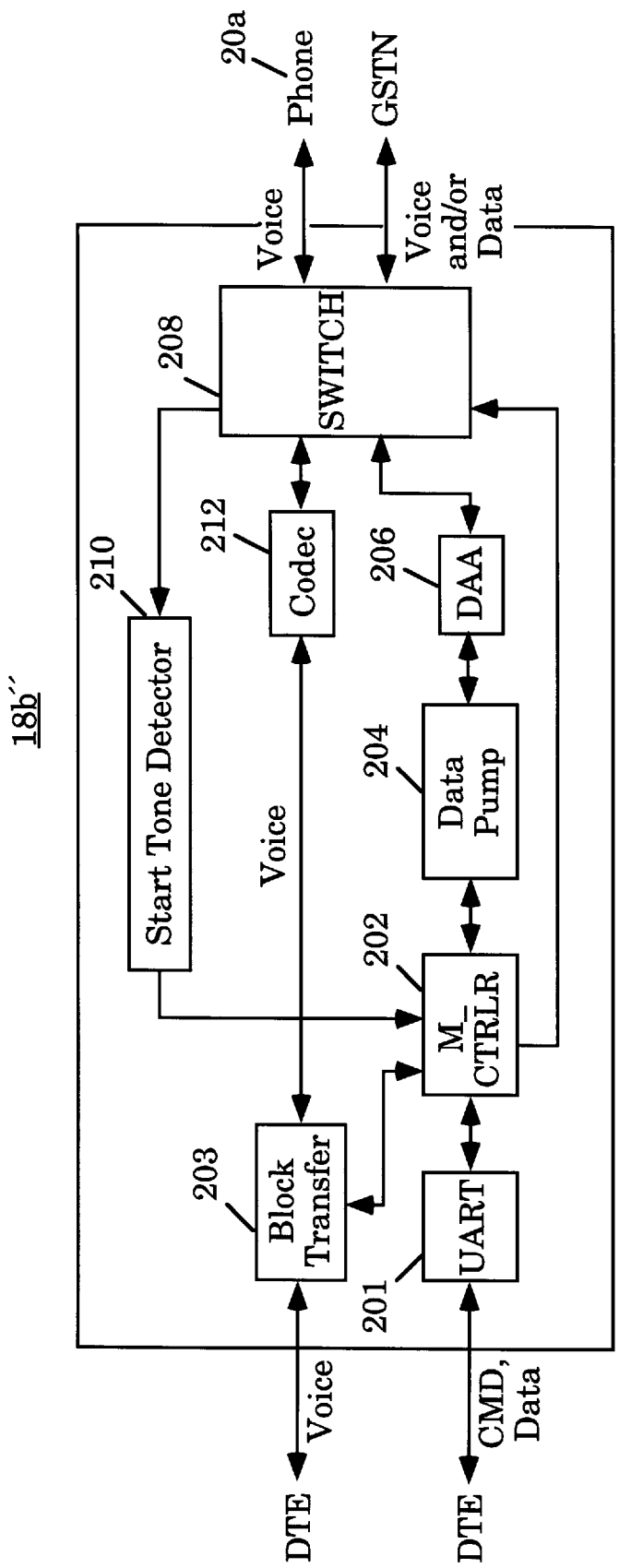
Figure 1C:
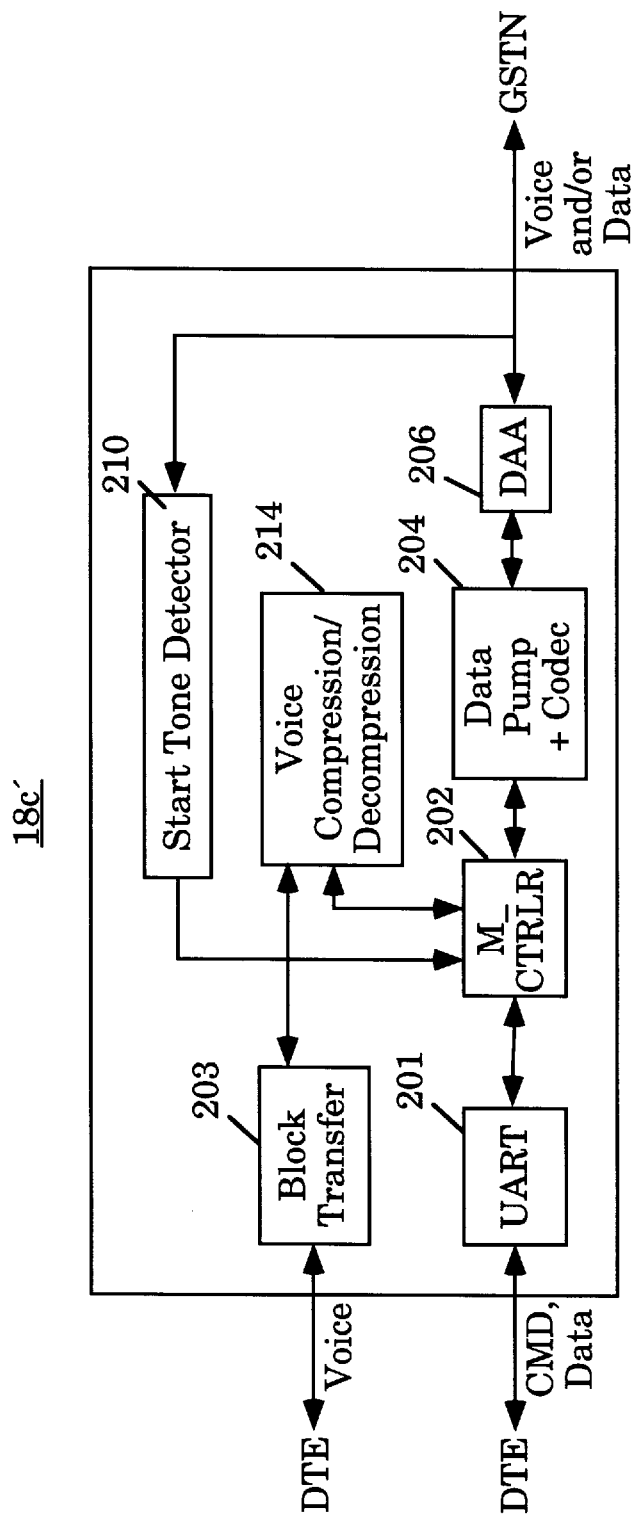
Figure 1D:
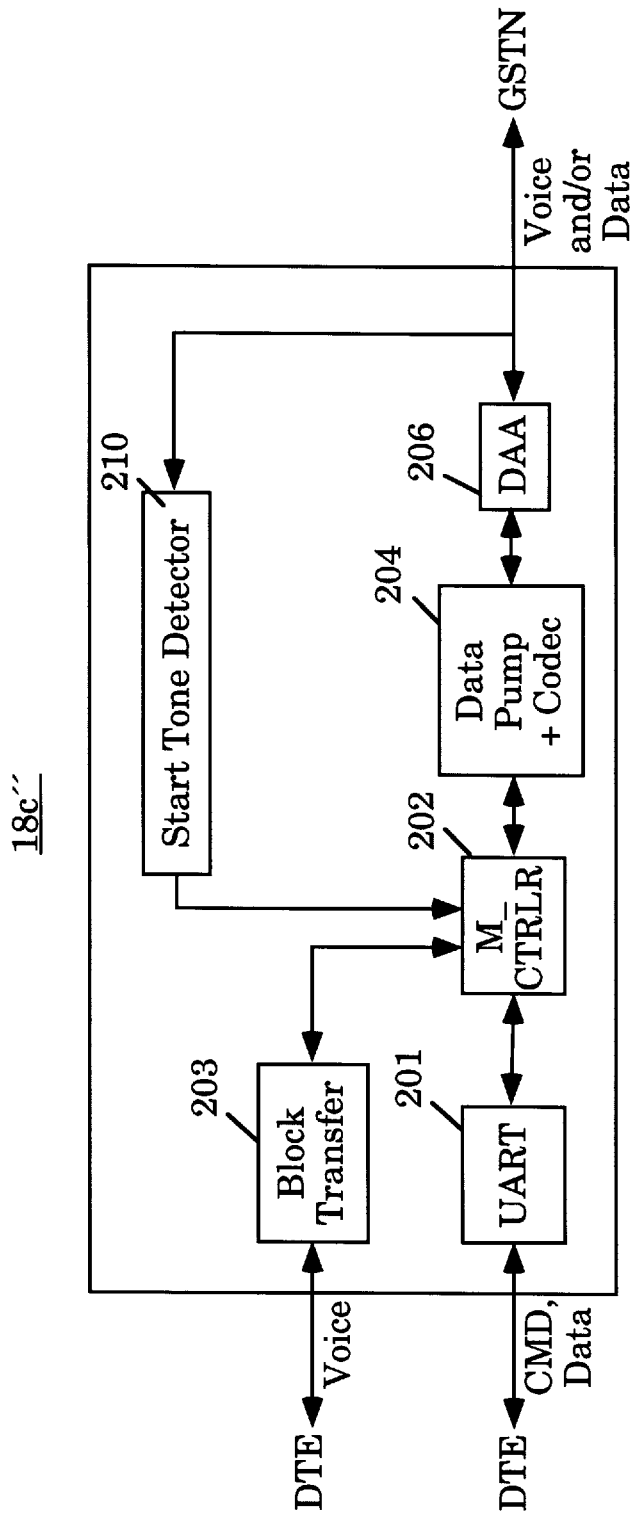
Figure 2A:
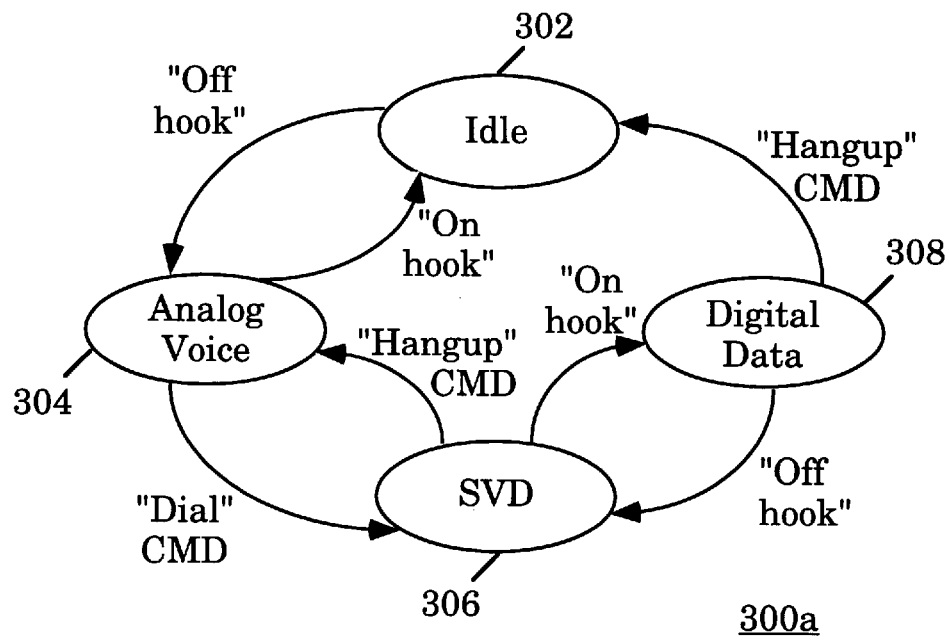
FIGS. 2a and 2b illustrate the operating modes and mode transition rules of the enhanced micro-controllers of FIGS. 1a–1d.
Figure 2B:
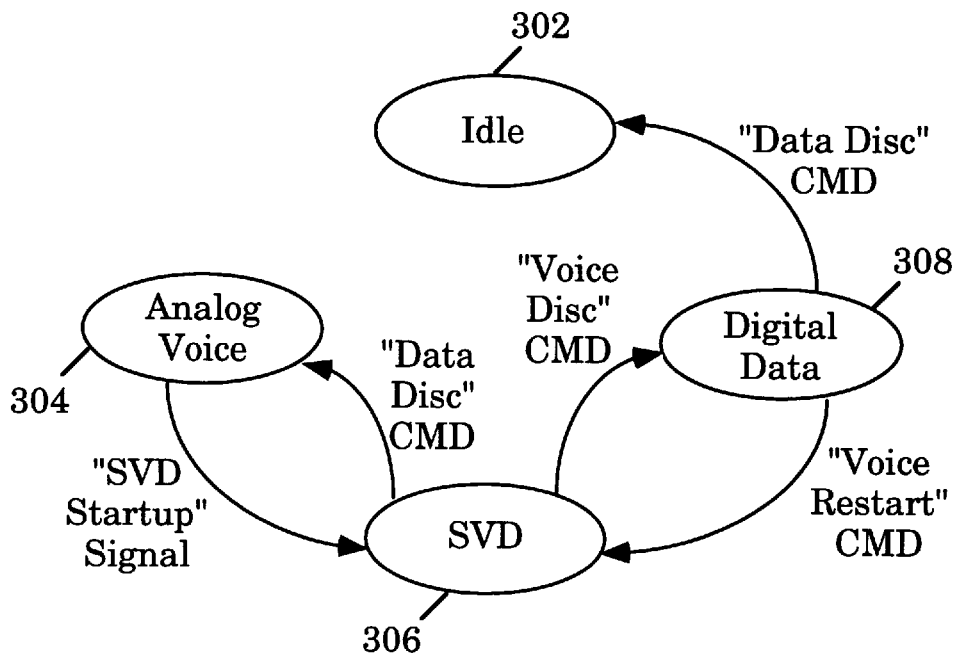

Referring now to FIGS. 2a–2b, two state diagrams illustrating the operating modes and transitional rules of the enhanced micro-controllers of FIGS. 1a–1d are shown. As illustrated, the enhanced micro-controller 202, responsive to local events or commands as well as remote commands, controls the operation of the DCE 18a–18c in one of four modes, an idle mode 302, an analog voice mode 304, a digital data mode 308, and a simultaneous voice and data (SVD) mode 306.

In particular, during operation, as illustrated in FIG. 2a, from the analog voice mode 304 the micro-controller 202 of either a call originating or a call responding DCE 18a–18c either returns the DCE 18a–18c to the idle mode 302, upon detection of a local telephone being returned to an "on hook" condition from an "off hook" condition; or places the DCE 18a–18c in the SVD mode 306, upon receipt of a "dial" command from a-local DTE 16a–16c, and operates the DCE 18*a*–18*c* accordingly. Under the SVD mode 306, the micro-controller 202 causes digitized voice as well as data to be exchanged with the other DCE 18*a*–18*c* at the other end of the analog-loop telephone line.

Either the call originating or the call responding DCE 18*a*–18*c* may receive the "dial" command from the local DTE 16*a*–16*c*. In other words, either the call originating or the call responding DCE 18*a*–18*c* may initiate transitioning the call from the analog voice mode 304 to the SVD mode 306.

Additionally, during operation, as illustrated by FIG. 2*b*, from the analog voice mode 304, the micro-controller 202 of either the call originating or the call responding DCE 18*a*–18*c* places the DCE 18*a*–18*c* in the SVD mode 306, upon detection of receiving a predetermined "start up" signal pattern from the other DCE 18*a*–18*c* at the other end of the analog-loop telephone line connection, and operates the DCE 18*a*–18*c* accordingly. Since either the call originating or the call responding DCE 18*a*–18*c* may initiate the mode transition, the predetermined "start up" signal pattern receiving DCE 18*a*–18*c* may be either the call originating or the call responding DCE 18*a*–18*c*.

For the embodiments illustrated in FIGS. 1*a*–1*b*, the "loop current detector" of the switching circuitry 208 is also used to detect the "on hook" and "off hook" conditions of the standalone telephone 20*a*. For the embodiments illustrated in FIGS. 1*c*–1*d*, the DTE 16*c* simulates the "on hook" and "off hook" conditions of the integrated telephony circuitry 20*b*.

The manner in which the "dial" command is provided to the call originating or the call responding DCE 18*a*–18*c* is protocol dependent. For example, under Telecommunication Industry Association (TIA) and Electronic Industry Association (EIA) 602 protocol, the "dial" command is provided by the "ATD" modem command.

The predetermined "start up" signal pattern unambiguously identifies to the mode transition responding DCE 18*a*–18*c*, the mode transition initiating DCE's desire to transition the call from the analog voice mode 304 to the SVD mode 306. The predetermined "start up" signal pattern is also protocol dependent. For examples, the predetermined "start up" signal pattern may be defined using International Telecommunication Union—Technical Standardization Sector (ITU-T) Recommendation V.25 or Draft Recommendation V.8 (see the corresponding ITU-T Recommendations for further details). As a further example, the predetermined "start up" signal pattern may be based on Bell Communication Research's (Bellcore) Analog Display Services Interface (ADSI) Customer Premises Equipment (CPE) Alerting Signal (see Bellcore publications TR-NWT-000030 and TR-NWT-001273 for further details).

In one embodiment, as will be described in more details below, the other DCE 18*a*–18*c* confirms its support for SVD mode operation. Upon confirmation, the mode transition initiating and responding DCEs 18*a*–18*c* jointly establish multiple logical connections, and voice and data transmission protocols over these multiple logical connections. Upon establishing the logical connections and the transmission protocols, preferably, as will be also described in more detail below, the mode transition initiating as well as the responding DCE 18*a*–18*c* multiplex voice and data onto the single analog-loop telephone line. Preferably, voice are transmitted without error correction at predetermined desired fix time intervals, whereas data are transmitted with error correction in between the nominally fixed time intervals. Within the present invention, voice is transmitted one block at a time (for low latency), while maintaining a high data bandwidth.

Voice are preferably transmitted without error correction, i.e. retransmission for reliability, because voice are "real-time data". Since it is real time, the data stream cannot be delayed for retransmission. Furthermore, infrequent dropped voice are typically not noticed by the user anyway. The time duration between two voice transmissions are predetermined based on desired voice quality, principally but not exclusively, an user's perception of voice delay.

For further description of the other non-SVD operating modes, the manners in which the DCE is operated in each of the other non-SVD operating modes, and other operating mode transitions, see all the above identified and incorporated by reference U.S. patent application, Ser. No. 08/265,455.

Figure 3:
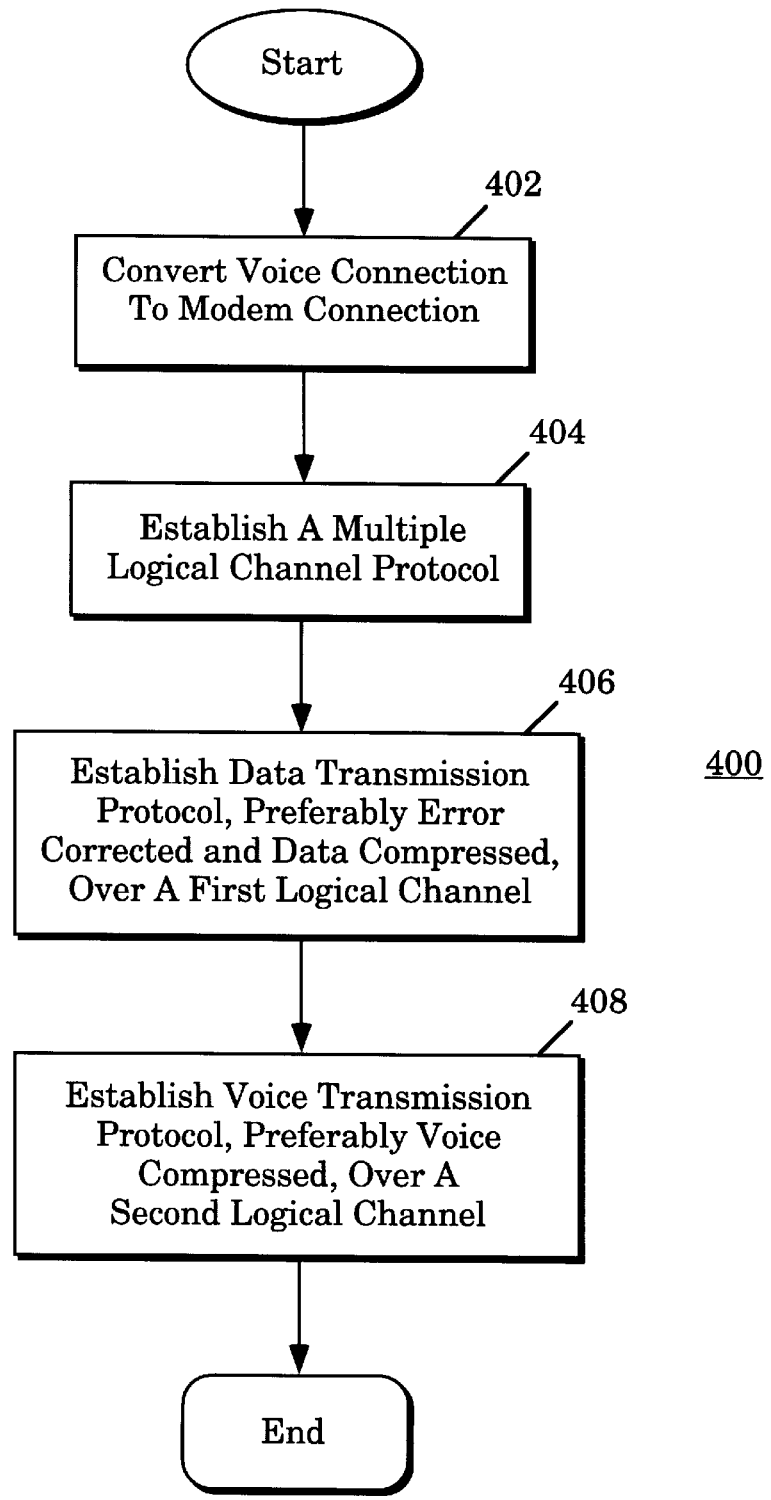
FIG. 3 illustrates the method steps employed by the enhanced micro-controllers of FIGS.1a–1d for converting a call from the analog voice mode to the simultaneous voice and data mode.

Referring now to FIG. 3, a block diagram illustrating the method steps of the present invention performed by the DCEs for converting a call from the analog voice mode to the SVD mode is shown. As illustrated, the mode transition initiating and responding DCEs 18*a*–18*c* first cooperate to convert the voice connection to a modem connection, block 402. Next, the mode transition initiating and responding DCEs 18*a*–18*c* then cooperate to establish a multiple logical channel protocol for the modem connection, block 404. The multiple logical channel protocol should have at least two logical channels, one for voice transmission and one for data transmission. Upon establishing the multiple logical channel protocol, the mode transition initiating and responding DCEs 18*a*–18*c* cooperate to establish a data transmission protocol for the logical data channel(s), block 406. Preferably, as described earlier, the data transmission protocol is error corrected, and data compressed. Similarly, the mode transition initiating and responding DCEs 18*a*–18*c* cooperate to establish a voice transmission protocol for the logical voice channel(s), block 408. Preferably, also as described earlier, the voice transmission protocol is voice compressed, but not error corrected. Voice are transmitted at predetermined desired nominally fixed intervals. Although the present invention is being described with the data transmission protocol being jointly established before the voice transmission protocol, the present invention may be practiced with the order reversed.

In one embodiment, the mode transition initiating and responding DCEs 18*a* or 18*b* use the predetermined "start up" signal pattern and a predetermined "confirmation" to convert the voice connection to a modem connection, block 402. Then, the mode transition initiating and responding DCEs 18*a*–18*c* jointly use V.42 detection phase to establish the multiple logical channel connection, block 404. Next, the "calling" and "answering" DCEs 18*a*–18*c* jointly use V.42's protocol phase to establish the data transmission protocol for the logical data channel, block 406. Finally, the "calling" and "answering" DCEs 18*a*–18*c* also jointly use V.42's protocol phase to establish the voice transmission protocol for the logical voice channel, block 408. The establishment of the voice transmission protocol includes jointly negotiating a voice compression/decompression algorithm for the voice transmission protocol, and determining a voice blocking factor based on the negotiated voice compression/decompression algorithm for the voice transmission protocol.

For further description of converting a multi-modal voice and/or data call from the analog voice mode to the SVD mode, including the determination of voice blocking factor, see U.S. patent application, Ser. No. 08/265,314, filed Jun. 24, 1994, entitled Method and Apparatus for Automatically Converting From an Analog Voice Mode to a Simultaneous Voice And Data Mode . . . for a Multi-Modal Voice and/or Data Call over a Single Analog-Loop Telephone Line, which is hereby fully incorporated by reference.

Figure 4:
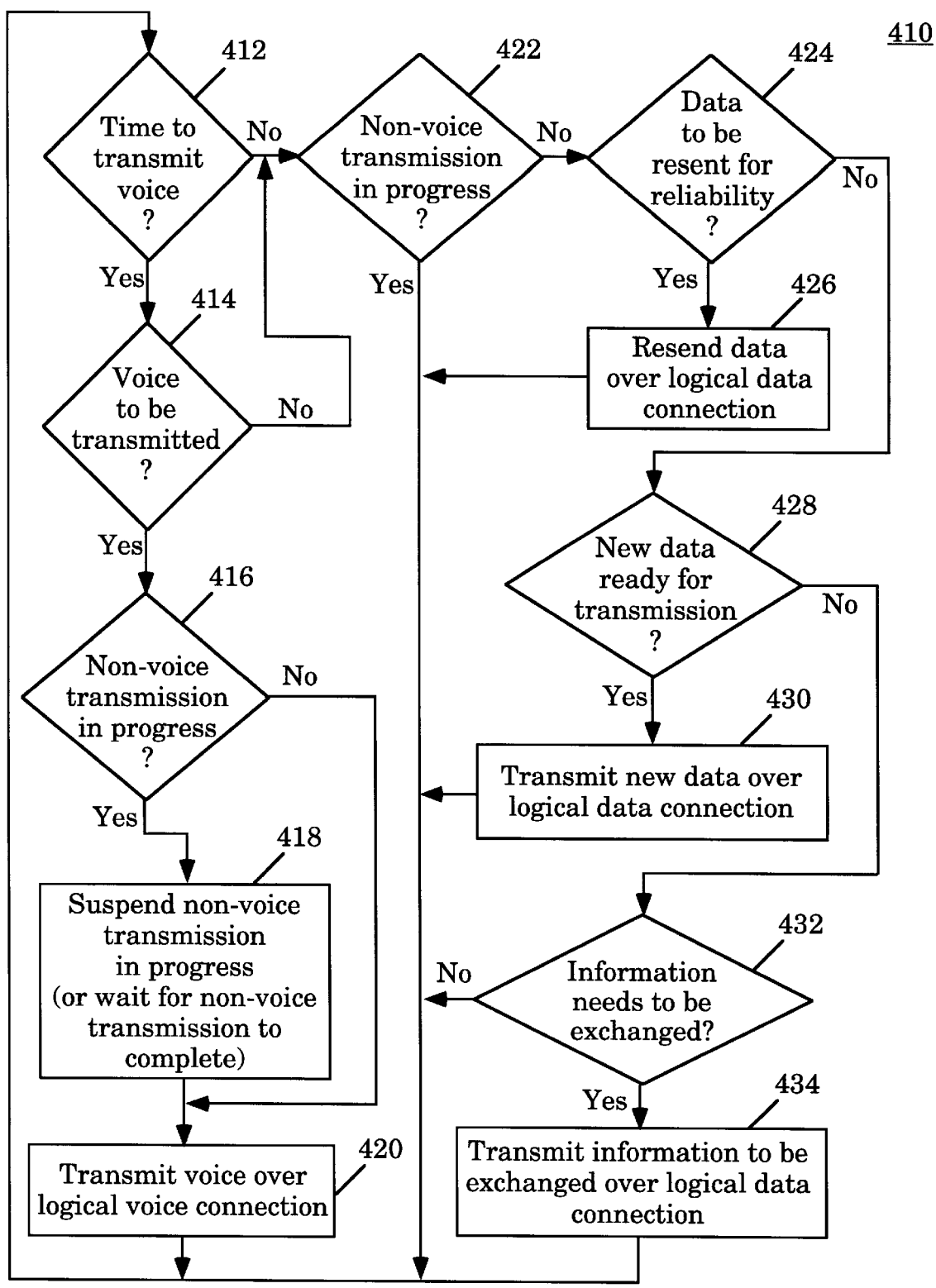
FIG. 4 illustrates the method steps of the present invention for multiplexing voice and data over the logical voice and data connections.

Referring now to FIG. 4, a block diagram illustrating the method steps of the present invention for multiplexing voice and data over the multiple logical connections is shown. As illustrated, the micro-controller 202 continuously monitors and determines whether it is time to transmit voice, block 412. If it's time for voice transmission, the micro-controller 202 further determines whether there are voice to be transmitted, block 414. If there are voice to be transmitted, the micro-controller 202 further determines whether there are non-voice transmission in progress, i.e. data or information to be exchanged, block 416. In one embodiment, if non-voice transmission is in progress, the non-voice transmission is suspended, step 418. Alternatively, the micro-controller 202 may be implemented to wait for the end of the non-voice transmission. Thus, if there is no non-voice transmission in progress, or after suspending the non-voice transmission, or waiting for the non-voice transmission to be completed, voice are transmitted over the logical voice connection, block 420.

If it is not time to transmit voice or if it is time to transmit voice but there are no voice to be transmitted, the micro-controller 202 further determines if non-voice transmission is in progress, block 422. If non-voice transmission is in progress, the micro-controller 202 returns to block 412.

On the other hand, if there is no non-voice transmission in progress, the micro-controller 202 determines if data are to be re-transmitted for reliability, block 424. In other words, acknowledgment of previously transmitted data have not been received within a predetermined time interval. If data are to be re-transmitted for reliability, the micro-controller 202 re-transmits the data as specified in ITU-T Recommendation V.42, block 426.

If there is no data requiring re-transmission for reliability, the microcontroller 202 determines if there are new data ready for transmission, block 428. If there are new data ready for transmission, the micro-controller 202 transmits the new data, block 430.

Lastly, if there is no new data to be transmitted, the micro-controller 202 determines if there are information to be exchanged with the cooperating DCE, block 432. If there are information to be exchanged, the micro-controller 202 transmits the information to be exchanged, block 432.

In other words, data re-transmission for reliability is favored over transmission of new data, and transmission of new data is favored over transmission of information to be exchanged between the cooperating DCEs.

In the above described V.42 embodiment, voice are transmitted with UI frames with the data link connection identifier (DCLI) set to the logical voice connection. Data are transmitted and re-transmitted with numbered information (I) frames with the DCLI set to the logical data connection. When suspending data transmission, the I frame is completed as soon as possible by sending the terminating Frame Check Sequence octets and HDLC flag bit pattern.

Multiplexing the compressed voice and data in the manner described using the procedures detailed in the ITU-T Recommendation V.42 allows the micro-controllers 202 to enable or disable the logical connections, and to negotiate parameters to be performed using standard mechanisms. For instance, SABME and DISC frames allow the channels to be activated and deactivated, and XID frames allow parameters to be negotiated.

Data Communication Suspension

An embodiment of the present invention is described wherein high bandwidth communication of multiplexed data and voice communication is allowed and further high bandwidth efficiency is maintained during periods when the real time bandwidth is a large percentage of the total available bandwidth. This is true while providing low latency for real-time information transmission (such as for voice data).

Figure 5:
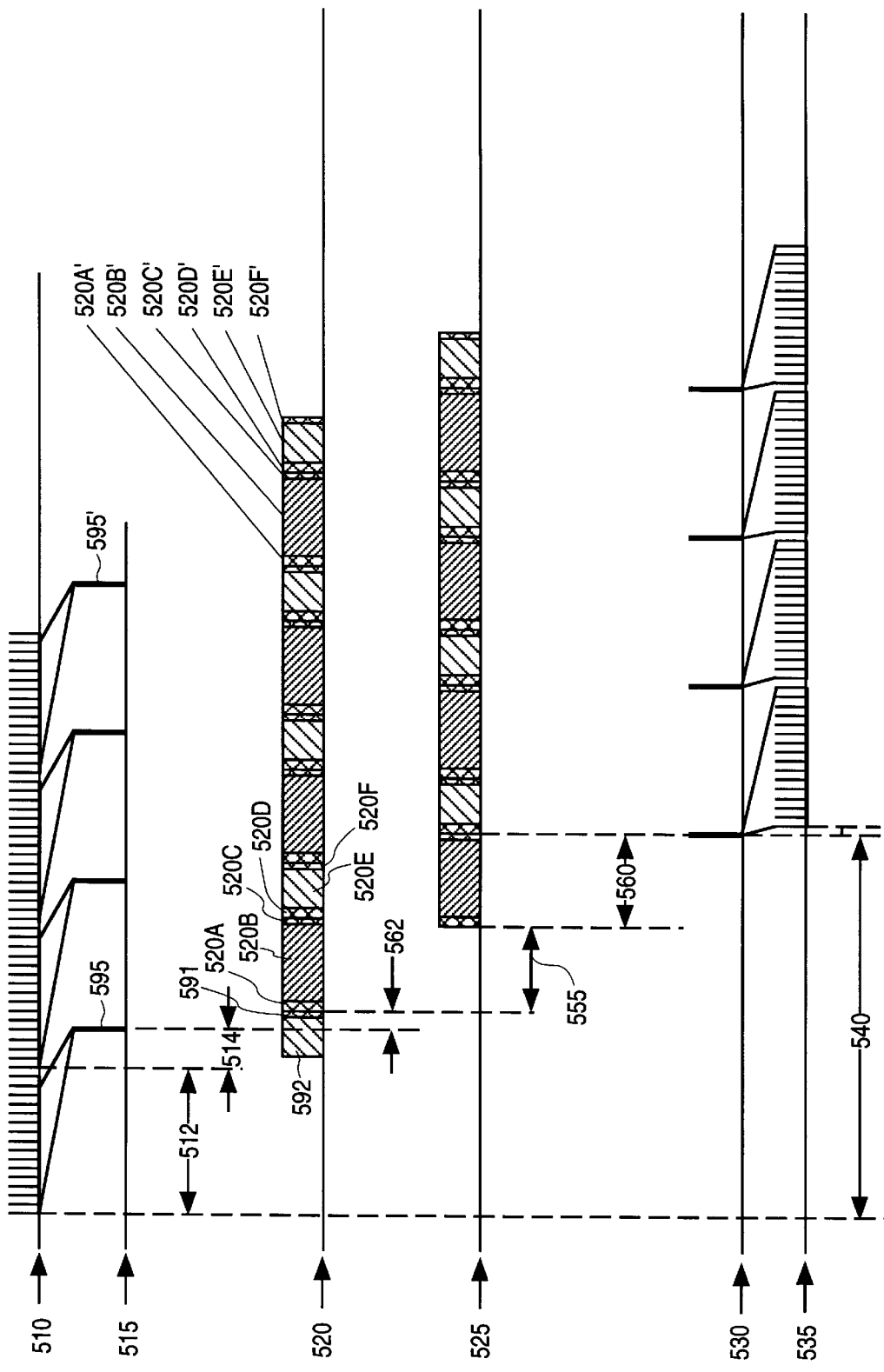
FIG. 5 illustrates timing diagrams of various signal forms transmitted over and received over a single analog loop telephone line.

FIG. 5 illustrates representative timing diagrams for several different signals relevant to data communication over a single analog loop telephone line. Signal 510 represents digitized voice data that is generated in discrete intervals 512 (e.g., 20–30 milliseconds) and output in digital form. These signals are digitized by Codec 212. For each sample period 512 (e.g., 20–30 milliseconds), the digitized voice samples are compressed by unit 214 and the output of the compressing unit 214 is shown as signal 515. The small delay (e.g., 6–10 milliseconds) associated with the compression is shown as interval 514. Therefore, real-time voice data for transmission is supplied and ready for transmission at approximately every interval 512 (or every 20–30 milliseconds, for instance).

Signal 520 of FIG. 5 illustrates the data stream sent from a transmitter 18z over the single analog loop telephone line. The data is sent in the form of HDLC frames within the V.42 standard. Transmission 592 illustrates that a data transmission is occurring at the time in which compressed voice data 595 becomes ready for transmission. As shown, the data transmission is effectively stopped before complete and a framing bits are transmitted 591 to close out the preceding data frame and then the audio frame representative of the compressed data transmission 595 is transmitted. The audio frame (520a–520c) is composed of the following data sections. A small delay 562 (e.g., 1–2 milliseconds) is present before the audio data frame is transmitted. First an audio flag start bit 520a is transmitted. In conjunction with the audio flag, and within 520a, a DLCI for audio data is transmitted followed by a UI Frame control byte for the audio data. Then the audio data (representative of compressed signal 595) is transmitted as 520b. At the completion of the audio data transmission, at 520c an audio end of frame control signal is transmitted. At 520d, a data flag and DLCI for data and I control bits for data transmission are transmitted. Then at 520e, the data of transmission 592 is restarted for completion (assuming voice data does not stop the data transmission again). At 520f, frame control bits are transmitted to end the data transmission.

This type of transmission is repeated for each of the real-time signals that becomes ready coincidentally with the transmission of non real-time data. For instance, signal 520 of FIG. 5 also illustrates the this procedure for interrupting a data transmission to transmit a real-time voice transmission is repeated (e.g., for compressed voice data 595'). As shown, audio data framing bits and audio data are transmitted as 520a'–520c' and the data is then continued as 520d'–520f'. Signal 525 represents the signal 520 as received by receiver electronics. The time period 555 represents modulation-demodulation delay plus one-way channel delay (if present). Interval 560 represents the period required for transmission of the voice data including the start framing bits to start the voice transmission data and the end framing bits required to end the voice transmission data. Signal 530 represents the decompression output at the receiving side of the circuit and signal 535 represents the Codec digital to analog converter output where the voice data is converted back to an audible signal. Therefore, interval 540 represents the total latency required to transmit multiplexed audio signal over the communication channel from the time the audio signal is first processed by the transmitter side to the time when the audio is first available to the receiver as an audible signal. This interval 540 is on the order of 60–70 milliseconds.

Figure 6:
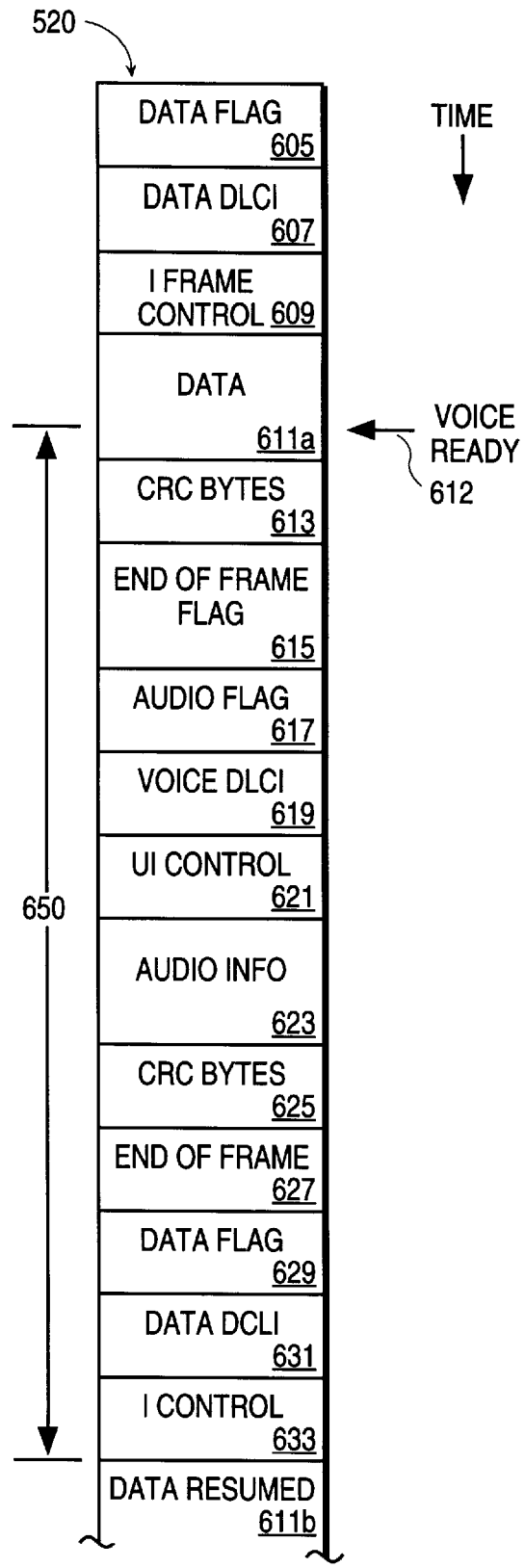
FIG. 6 illustrates a detailed view of a transmission timing diagram of a prior art method of suspending a data transmission for sending a pending voice transmission.

FIG. 6 illustrates in more detail the transmission (e.g., as seen over line 520) required for stopping non real-time transmission in order to transmit a real-time transmission under the V.42 protocol. A data flag 605 starts the preceding data frame followed by a data DLCI 607. Then an I frame control is sent 609 followed by the non real-time data 611 a over a particular channel of the single analog loop telephone line. Before the completion of the data 611a, real-time voice data is ready for transmission as shown by the arrow 612. The data transmission is therefore stopped. At this time, CRC bytes (cycle redundancy check) 613 are transmitted for the portion 611a of the data transmitted. Next, end of frame flag bits 615 are transmitted to end the data HDLC frame. At 617, audio flag start bits are transmitted (transmission 617 and 615 may be the same) to start the audio HDLC frame. At 619, audio or "voice" DLCI framing bits are transmitted and an UI Control frame is transmitted at 621.

At 623, the audio or voice data is transmitted and following another CRC bytes 625 is transmitted followed by an end of frame byte 627 to mark the end of the audio data frame. Next, at 629 a data start flag is transmitted following by a data DLCI 631 and then an I control byte for the data 633 and then the data is started again at 611b. It is appreciated that the data frame 611b can be interrupted by another voice transmission if ready before the data 611b is completely transmitted.

As understood within the system described above, the interruption of a data transmission by a audio transmission involves a large number of framing bits to stop the data transmission (e.g., 613, 615), then framing bits are required to start the audio frame (e.g., 617, 619, and 621), then framing bits are required to end the audio frame (e.g., 625, 627) and lastly, framing bits are required to restart the interrupted data (e.g., 629, 631 and 633). During high bandwidth transmission when high amounts of real-time transmission is present coincidentally with high bandwidth non real-time data transmission, the bandwidth required to transmit framing bits increases to a large amount. This reduces the efficiency of the overall communication transmission as framing bits consume a large amount of the bandwidth that could otherwise be devoted to data or real-time (voice) transmission.

The present invention provides a procedure and circuit for allowing efficient transmission and reception of both data and real-time (voice) transmission without increasing the latency for voice transmission. The present invention accomplishes the above without substantial modification to the HDLC hardware used for the transmission and reception (e.g., unit 18z).

Instead of stopping the data transmission and restarting the interrupted data transmission as done in FIG. 6, the present invention rather "suspends" the data transmission by the transmission of a special character (e.g., an escape) that immediately precedes the transmission of the audio information. Following the end of the audio transmission, the data transmission is resumed without any intervening framing bits. Hardware modifications to the HDLC modem circuitry are only required for the detection of the escape character, under the present invention. It is appreciated that this aspect of the present invention applies only within the situation when data is being transmitted in coincidence with a voice transmission. In other situations, the standard V.42 protocol is followed.

Figure 7:
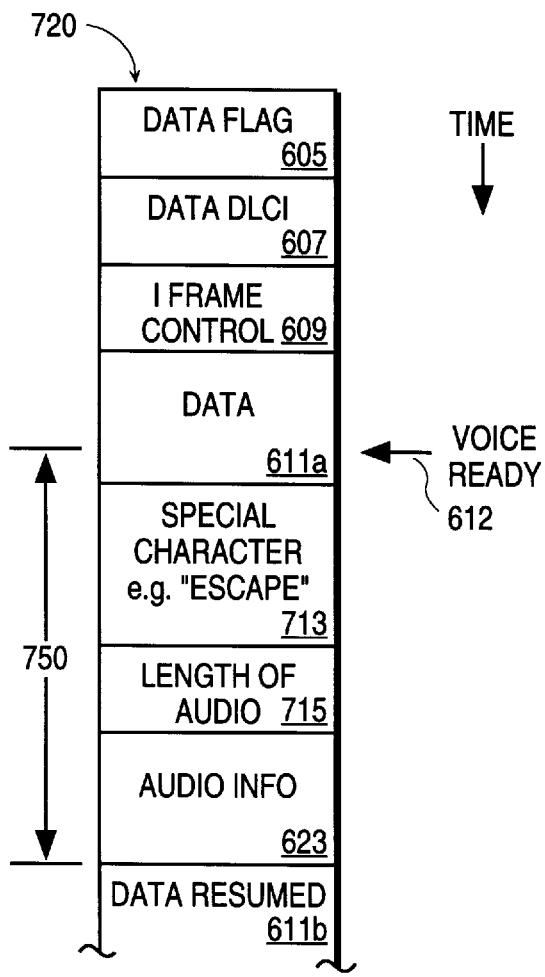
FIG. 7 illustrates a detailed view of a transmission timing diagram of the present invention method for suspending a data transmission for sending a pending voice transmission.

FIG. 7 illustrates a timing diagram in accordance with the present invention signal transmission 720. The diagram illustrates the transmission sequence implemented by the present invention in the situation when voice data is ready coincidentally with the transmission of non real-time data. As shown, a data flag 605 is sent followed by a data DLCI frame 607 followed by an I frame control byte 609 and then followed by the non real-time data 611a. At 612, voice data is ready for transmission before the completion of the data transmission 611a. At 713, the present invention transmits a special character. For example, this character can be any possible transmission character, but within the exemplary implementation this is the "escape" character. Next, the present invention determines and thereafter transmits the length 715 (e.g., in bytes or words or other equivalent measure) of the voice transmission. At 623, the present invention then transmits the audio information. At the completion of the audio information 623, the present invention resumes transmission of the "suspended" data transmission at 611b. The transmission of the length of the audio information enables a smooth transmission between the audio information and the resuming of the data transmission.

FIG. 7 illustrates that framing bits are not required to terminate transmission of the interrupted data portion (e.g., 61a). Further, framing bits are not required to start transmission of the audio information (e.g., 623). Further, framing bits are not required to end the audio information transmission and are not required to start transmission of the previously interrupted data information (611b). Therefore, during periods of high bandwidth transmission of real time information, during periods when the non real-time data is interrupted at a high rate, the available bandwidth pursuant to the present invention is not consumed with the transmission of framing bits (which can be a large percentage of the available bandwidth within the prior art systems). Further, due to the implementation adopted by the present invention, only minor hardware modifications are required of the V.42 modem hardware, even in cases where the HDLC formatter is tightly coupled to the data pump.

Figure 8A:
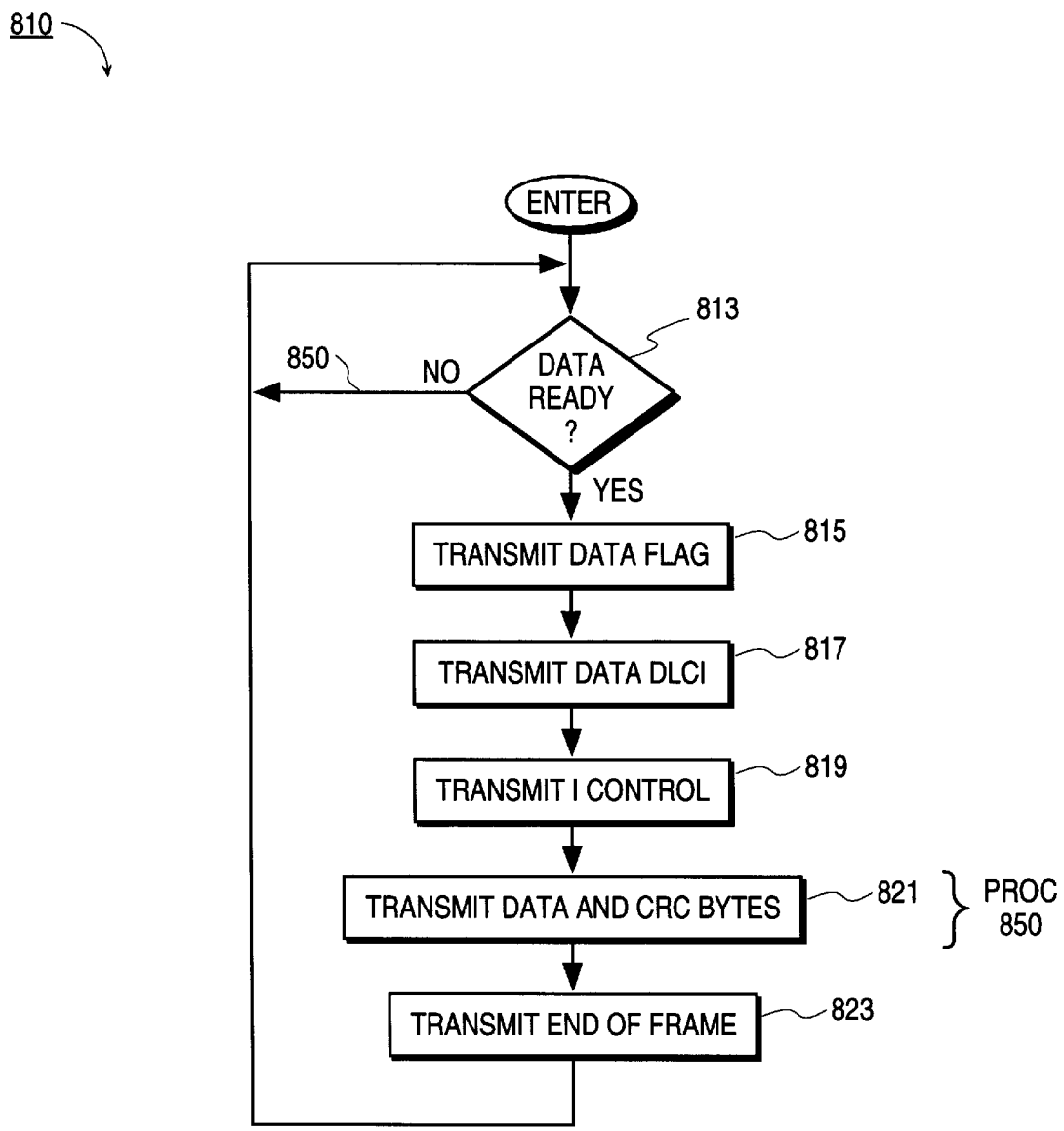
FIG. 8A and FIG. 8B illustrate processes of the present invention method for suspending a data transmission for sending a pending voice transmission.
Figure 8B:
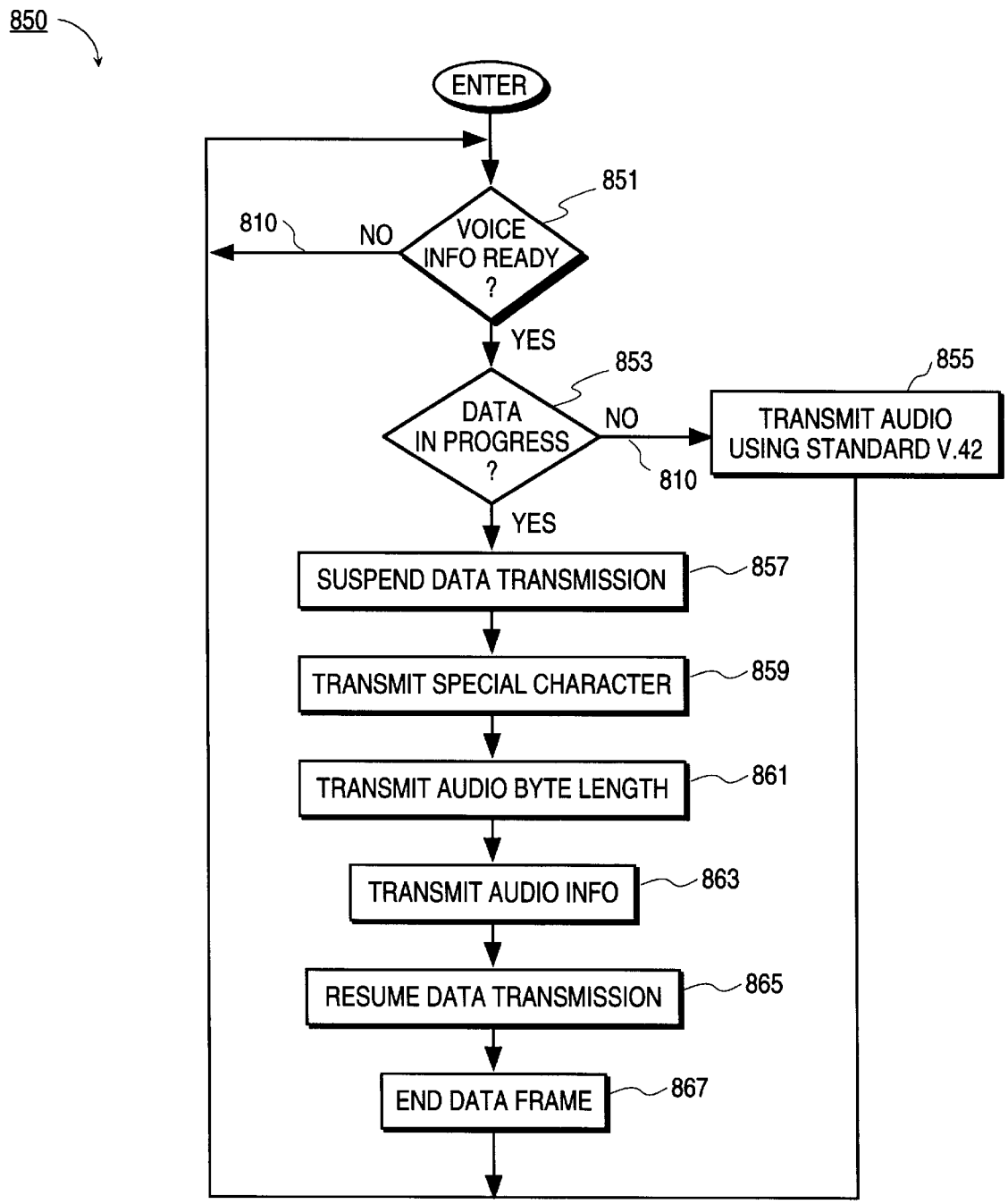
Figure 9:
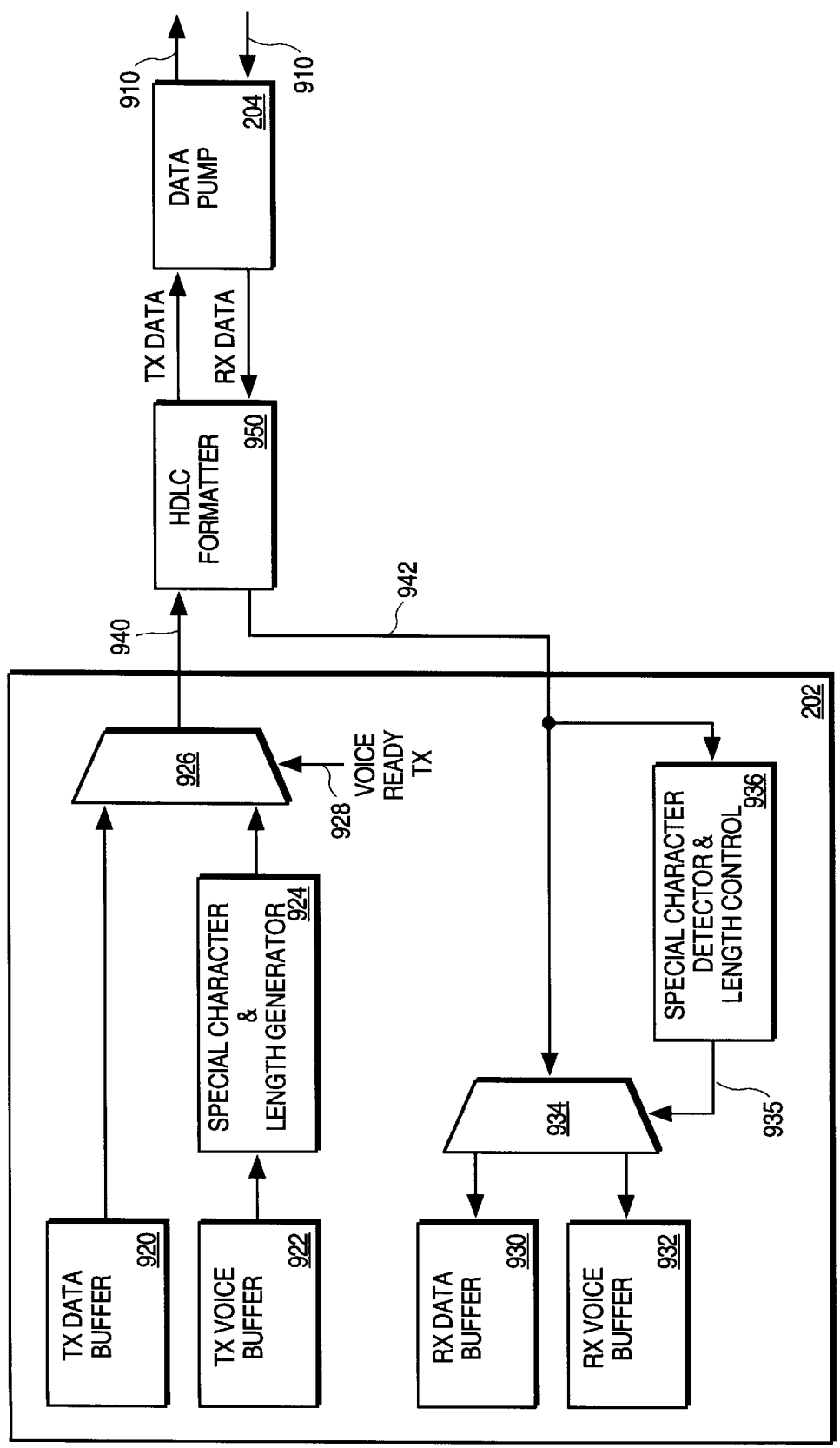
FIG. 9 is an exemplary circuit and logic diagram for implementing the method of the present invention for suspending a data transmission for sending a pending voice transmission.

FIG. 8A and FIG. 8B illustrates processing tasks implemented by the present invention to perform the above described transmission protocol. It is appreciated that the processing tasks of the present invention are performed by hardware similar to devices represented by 18z, however, they are modified as shown by FIG. 9 and as discussed later to follow. These processing steps, pursuant to the present invention, can be realized in firmware or via an ASIC and does not require modifications to the HDLC hardware.

FIG. 8A illustrates procedure 810 of the present invention for transmission of the non real time data. At task 813, the present invention responds if data information (e.g., non real time) is ready and available for transmission. If no, then the present invention returns to task 813 but also checks process 850 (FIG. 8B) to see if voice (e.g., real time information) is ready for transmission. If data is ready for transmission, then at block 815 the present invention transmits the data flag and at block 817 the data DLCI framing bits and at block 819 the I control for data is transmitted. These are pursuant to the V.42 protocol. At block 821, the data information is then transmitted (e.g., the information frame). At the completion of the data transmission during block 821, the CRC bytes are then computed and transmitted based on the information transmitted from the start data flag. It is appreciated that the processing of block 850 can interrupt block 821 if voice data is ready for transmission. At the end of the data transmission (whether interrupted by real time data or not), at block 823, the present invention transmits a end of frame bit sequence to indicate the end of the data frame. Processing then return to block 813.

FIG. 8B illiterates the processing 850 of the present invention for transmission of voice information (e.g., real time information). According to the present invention, voice information, when available, is readied for transmission at a period rate (for example, every 30, 60 or 90 milliseconds). At block 851, if the voice information is not ready or available, then the present invention checks to see (e.g., at block 810) if non real time data is ready for transmission. If the real time voice information is ready for transmission, then at block 853 the present invention checks if data is in the process of being transmitted. If not, then at block 855 the data is transmitted in a UI frame according to the standard V.42 protocol and processing returns to block 851.

At block 853, if data is in the process of being transmitted, then at block 857 the present invention waits until the data information is being transmitted (e.g., waits until the framing bits associated with the start of the data frame are transmitted) and then suspends the data transmission. It is appreciated that the data transmission is suspended and not terminated. No end framing bits (e.g., to end the data frame transmission) are transmitted at this point within the present invention. At block 859, the present invention then transmits a special character (e.g., an escape character) to indicate that embedded audio information is to follow.

The receiving unit, upon reception of the special character, is queued to receive the embedded voice information. At block 861 the present invention determines the length of the audio information and transmits this length over the single analog loop telephone line. At block 863, the embedded audio information is then transmitted over the single analog loop telephone line; no start of frame framing bits are required at this point, only the special character and the audio length. The audio information transmitted by block 863 is "embedded" in so far as it is transmitted within the information frame of the non real time (e.g., non voice) data. By transmitting the length of the embedded audio transmission, the receiver unit can determine when the embedded audio transmission ends. Therefore, at the completion of the transmission of the embedded audio information, the receiver is queued for immediately returning to receiving the suspended non voice transmission.

At block 865 of FIG. 8B, the present invention then resumes the suspended transmission of the data information that was suspended in block 857. It is appreciated that the transmission of block 865 can be interrupted by the broadcast of another audio information package. In effect, the processing starting at block 851 is active during the processing of block 865. At the completion of the data transmission, at block 867 the present invention computes and transmits the check sequence CRC bytes that are computed based on everything after the data start flag, including voice information, assuming current HDLC hardware is not substantially modified. Also during block 867, the end of data frame is transmitted over the analog loop telephone line. Regarding the start of block 857, and with reference to FIG. 7, this block can begin within the transmission of data 61a. However, according to a particular embodiment of the present invention, block 857 waits until blocks 605, 607 and 609 are complete before starting, assuming voice information is ready for transmission before block 611a is sent. This is done so that the framing bits that are transmitted before the data can complete before the data is suspended.

It is appreciated that the present invention adopts the transmission of a special character to signal the start of an embedded voice transmission. If this character is an escape character, then the present invention needs to redefine the escape character for purposes of data transmission. According to the present invention, the escape character for purposes of data transmission is then <escape> <escape>. Therefore, in order to transmit an escape in the data frame, it must be transmitted twice. Likewise, double transmission of the escape will not then signal an embedded audio transmission. It is also appreciated that the special character of block 859 of FIG. 8B can also be a special sequence of characters rather than just a single character. In this case, block 859 transmits a special character code or string. With respect to FIG. 8B, the step of determining the length of the audio transmission, performed by the microcontroller, can occur at any time previous to transmission of the actual length over the telephone line and after the audio information becomes ready for transmission. It is appreciated that, under one embodiment of the present invention, if the HDLC frame needs to be retransmitted, only the non-voice data is retransmitted.

FIG. 9 illustrates the logical modifications required to implement aspects of the present invention and these modifications can be accomplished via firmware modifications to the modem hardware or via ASIC changes. It is appreciated that an advantage of the present invention is that modifications to the modem hardware are not extensive or otherwise not required at all, this is true at least regarding the HDLC formatter hardware. FIG. 9 illustrates modifications of the present invention are implemented within any of the transmitting and receiving stations 18z. Those elements not shown in FIG. 9 are assumed to remain the same and perform similar functions as hereinabove described.

As shown in FIG. 9, the enhanced microcontroller 202 contains a transmit data (non real time data) buffer 820 and a transmit voice (real time) buffer 922. Buffers 920 outputs to a multiplexer 926 that is controlled by select line 928 which is switched when voice is ready for transmission. Buffer 922 outputs to a special character and length generator 924. When activated, circuit 924 generates the special character and generates the length of the voice data within buffer 922 for transmission. Buffer 924 outputs to another input of mux 926. When voice is ready for transmission, output from mux 926 is taken from block 924 and block 924 outputs to line 940, otherwise block 920 is selected for output over line 940. The output of the mux 926 is coupled via line 940 to input of an HDLC formatter circuit 950 (which is well known) for transmission of data.

The HDLC formatter circuit 950 is also coupled via line 942 to transmit data to the enhanced microcontroller 202 as received information. Line 942 is coupled to a special character detector and length counter circuit 936 which is also coupled to a select line 935 of a multiplexer 934. The input of the multiplexer 934 is also coupled to line 942. The enhanced microcontroller 202 also contains a receiver data (non real time) buffer 930 and a receiver voice (real time) buffer 932. The multiplexer 934 contains two outputs coupled to each buffer 930 and 932. The mux 934 is controlled via select line 935. Circuit 936 detects if the special character is transmitted over line 942 which originates from the HDLC formatter 950. When the special character is detected, the length code is also intercepted and for the following duration of the length code, circuit 936 generates a signal over line 935 which controls the flow of data from line 942 to the voice buffer 932. When not controlled in such way by line 935, data follows from line 942 to block 930.

With reference to FIG. 9, the HDLC formatter 950 is coupled via a transmit line and a receive line to a data pump 204 which is then coupled via lines 910 to the remainder of the circuitry of device 18z as appropriate. It is appreciated that the HDLC formatter circuit 950 may be part of the microcontroller 202 or part of the data pump 204. Further, it is appreciated that the elements described in FIG. 9 are discussed with respect to a single device of a coupled pair and therefore these elements are replicated for a corresponding device coupled to transmit and receive information from the device of FIG. 9.

Thus, a method and apparatus for reducing the transmission of framing bits by suspending rather then ending and restarting a data transmission is thus described utilizing a special character transmission and a voice length indication preceding an embedded voice transmission. While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus for efficiently transmitting multiplexed voice information and non voice information, said apparatus comprising:

a transmission microcontroller for transmitting voice information in accordance with a voice transmission protocol over a first logical connection established over an analog-loop telephone line at nominally fixed time intervals and for transmitting non voice information to be exchanged with a cooperating DCE in accordance with a data transmission protocol over a second logical connection established over said analog-loop telephone line when said transmission microcontroller is not transmitting voice information and when operating said DCE in a simultaneous voice and data (SVD) mode of operation; and said transmission microcontroller also for suspending transmission of non voice information over said second logical connection when voice information is ready for transmission, said transmission microcontroller for transmitting a special character to indicate transmission of said voice information and said transmission microcontroller for transmitting a signal indicating a length of said voice information and said transmission microcontroller for transmitting said voice information under a modified voice transmission protocol while said non voice information is suspended, said suspension permitting reinitiation of said non voice transmission without framing bits.

2. An apparatus as described in claim 1 wherein said transmission microcontroller immediately resumes transmission of said suspended non voice information over said second logical connection upon completing transmission of said voice information under said modified voice transmission protocol.

3. An apparatus as described in claim 1 wherein said voice information is real time information and wherein said non voice information is not real time information.

4. An apparatus as described in claim 2 further comprising:

a receiver microcontroller for receiving transmissions from said transmission microcontroller and for generating a first signal in response to receiving said special character, said receiver microcontroller queued for receiving said voice transmission in response to said first signal, and said receiver microcontroller queued for immediately receiving resumed transmission of said non voice information at completion of said voice information.

5. An apparatus as described in claim 2 wherein said modified voice transmission protocol does not include framing bits for transmitting said voice information.

6. An apparatus as described in claim 2 wherein said transmission microcontroller when operating said DCE in said SVD mode of operation, is further for transmitting voice information in accordance with said voice transmission protocol without error correction and wherein said transmission microcontroller when operating said DCE in said SVD mode of operation, is further for transmitting non voice information in accordance with said data transmission protocol with error correction.

7. An apparatus as described in claim 2 wherein said transmission microcontroller, when operating said DCE in said SVD mode of operation, is preferring retransmission of data for reliability over transmission of new data ready for transmission during intervals of time between voice transmissions.

8. An apparatus as described in claim 2, wherein said transmission microcontroller, when operating said DCE in said SVD mode of operation, is preferring transmission of new data ready for transmission over transmission of information to be exchanged between cooperating DCEs during time intervals between voice transmissions.

9. An improved data circuit terminating equipment (DCE), wherein the improvements comprise:

a microcontroller for operating the DCE in at least an analog voice mode or a simultaneous voice and data (SVD) mode, said microcontroller including control circuits capable of switching the DCE's operating mode from said analog voice mode to said SVD mode including establishment of voice and data transmission protocols to be used by said microcontroller;

said microcontroller, when operating said DCE in said SVD mode, for transmitting voice information in accordance with a voice transmission protocol over a first logical connection established over an analog-loop telephone line at nominally fixed time intervals and transmitting non voice information to be exchanged with a cooperating DCE in accordance with a data transmission protocol over a second logical connection established over said analog-loop telephone line when said microcontroller is not transmitting voice information; and said microcontroller for suspending non voice information transmission when voice information is ready for transmission, said microcontroller for transmitting a special character to indicate transmission of said voice information and said microcontroller for transmitting a signal indicating a length of said voice information and said microcontroller for transmitting said voice information under a modified voice transmission protocol while said non voice information transmission remains suspended, said suspension permitting reinitiation of said non voice transmission without framing bits.

10. An improved data circuit terminating equipment (DCE) as described in claim 9 wherein said microcontroller immediately resumes transmission of said suspended non voice information transmission over said second logical connection immediately upon completion of transmission of said voice information under said modified voice transmission protocol.

11. An improved data circuit terminating equipment (DCE) as described in claim 9 wherein said voice information is real time information and wherein said non voice information is not real time information.

12. An improved data circuit terminating equipment (DCE) as described in claim 10 further comprising:

a receiver microcontroller for receiving transmissions from said microcontroller and for generating a first signal in response to receiving said special character and for receiving said length, said receiver microcontroller queued for receiving said voice transmission in response to said first signal and said receiver microcontroller queued for immediately receiving resumed transmission of said non voice information at completion of said transmission of said voice information under said modified voice transmission protocol.

13. An improved data circuit terminating equipment (DCE) as described in claim 10 wherein said modified voice transmission protocol does not include framing bits for said transmission of said voice information under said modified voice transmission protocol.

14. An improved data circuit terminating equipment (DCE) as described in claim 10 wherein said microcontroller, when operating said DCE in said SVD mode, is for transmitting voice information in accordance with said voice transmission protocol without error correction.

15. An improved data circuit terminating equipment (DCE) as described in claim 10 wherein said microcontroller, when operating said DCE in said SVD mode, is for transmitting non voice information exchanged in accordance with said data transmission protocol with error correction.

16. A method for multiplexing voice and data over first and second logical connections over an analog-loop telephone line by a micro-controller of a data circuit terminating equipment (DCE) when operating said DCE in a simultaneous voice and data (SVD) mode of operation, said method comprising the steps of:

(a) transmitting voice information in accordance with a voice transmission protocol over a first logical connection established over said analog-loop telephone line at nominally fixed time intervals; and (b) transmitting non voice information to be exchanged with a cooperating DCE in accordance with a data transmission protocol over a second logical connection established over said analog-loop telephone line when not transmitting voice information; and (c) when transmitting said non voice information and voice information is coincidentally ready for transmission, performing the steps of:
(i) suspending transmission of said non voice information over said second logical connection when said voice information is ready for transmission,
(ii) transmitting a special character to indicate transmission of said voice information;
(iii) transmitting a signal indicating a length of said voice informations and
(iv) transmitting said voice information under a modified voice transmission protocol.

17. A method as described in claim 16 further comprising the step of immediately resuming transmission of said suspended non voice transmission over said second logical connection upon completion of said step of transmitting said voice information under said modified voice transmission protocol.

18. A method as described in claim 17 wherein said modified voice transmission protocol does not include framing bits for transmitting said voice information.

19. A method as described in claim 17 wherein said voice information is real time information and wherein said non voice information not real time information.

20. A method as described in claim 17 further comprising the steps of:

receiving voice information and non voice information transmissions;

receiving said special character and said length;

generating a first signal in response to receiving said special character;

preparing to receive said voice transmission in response to said first signal; and based on said length, preparing for immediately receiving resumed non oice information at completion of said step of transmitting said voice information under said modified voice transmission protocol.

21. A method as described in claim 17 wherein step (a) includes determining time intervals for voice transmission based on a voice blocking factor and desired performance throughput, said voice blocking factor being previously determined based on selection of a voice compression/decompression algorithm for said voice transmission protocol.

22. A method as described in claim 17 wherein step (a) includes transmitting voice in accordance with said voice transmission protocol without error correction.

23. A method as described in claim 17 wherein step (a) includes transmitting non voice information to be exchanged in accordance with said data transmission protocol with error correction.

24. A method for multiplexing voice and data over a first and a second logical connections over an analog-loop telephone line using a data circuit terminating equipment (DCE) when operating said DCE in a simultaneous voice and data (SVD) mode of operation, the method comprising the steps of:

(a) transmitting voice information in accordance with a voice transmission protocol over a first logical connection established over said analog-loop telephone line at nominally fixed time intervals when non voice information is not present; and (b) transmitting non voice information to be exchanged with a cooperating DCE in accordance to a data transmission protocol over a second logical connection established over said analog-loop telephone line when not transmitting voice information; and (c) when transmitting said non voice information and voice information is coincidentally ready for transmission, performing the steps of:
(i) suspending transmission of said non voice information over said second logical connection when said voice information is ready for transmission; and
(ii) transmitting said voice information under a modified voice transmission protocol wherein said modified voice transmission protocol does not include framing bits for voice information transmission.

25. A method as described in claim 24 wherein said modified voice transmission protocol comprises the steps of:

(i) transmitting a special character to indicate transmission of said voice information;

(ii) transmitting a length of said voice information; and (iii) transmitting said voice information under said modified voice transmission protocol.

26. A method as described in claim 25 further comprising the step of immediately resuming transmission of a suspended non voice transmission upon completion of said step of transmitting said voice information under said modified voice transmission protocol.

27. A method as described in claim 24 wherein said voice information is real time information and wherein said non voice information not real time information.

28. A method as described in claim 25 further comprising the steps of:

receiving voice information and non voice information transmissions;

receiving said special character and said length;

generating a first signal in response to receiving said special character;

preparing to receive said voice transmission in response to said first signal; and based on said length, preparing for immediately receiving resumed non voice information at completion of said step of transmitting said voice information under said modified voice transmission protocol.

* * * * *

UNITED STATES PATENT AND TRADEMARK OFFICE
CERTIFICATE OF CORRECTION

PATENT NO. : 5,878,120  
DATED : March 2, 1999  
INVENTOR(S) : O'Mahony

It is certified that error appears in the above-identified patent and that said Letters Patent is hereby corrected as shown below:

Column 5,
Line 55, delete "2148" and insert -- 212 --.

Signed and Sealed this

Twenty-fifth Day of November, 2003

JAMES E. ROGAN
*Director of the United States Patent and Trademark Office*